Sept. 27, 1960 D. B. KIRK 2,953,917
PNEUMATIC DIMENSION GAGES
Filed July 10, 1956

INVENTOR
David B. Kirk.
BY
ATTORNEY 2,953,917

PNEUMATIC DIMENSION GAGES

David B. Kirk, Oreland, Pa., assignor to Moore Products Co., Philadelphia, Pa., a corporation of Pennsylvania Filed July 10, 1956, Ser. No. 596,913

2 Claims. (Cl. 73—37.5)

This invention relates to pneumatic dimension gages and more particularly to pneumatic dimension gages having improved operating characteristics.

Pneumatic gages have heretofore been proposed operating upon the principle that if a fluid under constant pressure is forced through up-stream and down-stream orifices in series with one another, the gaseous pressure in the space between the orifices will be a function of the relative sections of the orifices and the measurement of the gaseous pressure in the space will indicate the effective area of the down-stream or discharge orifice, as varied by the position or dimensional relation of the work piece with respect thereto, within certain limits. The down-stream or discharge orifice usually is a gaging nozzle.

In accordance with the present invention a pneumatic gaging circuit is provided in which a constant differential pressure is maintained across a restriction which is subject to the gaging pressure.

The pneumatic gaging circuit in accordance with the present invention provides for a greater pressure change in response to the conditions at the gaging nozzle than has heretofore been available.

The pneumatic gaging circuit in accordance with the present invention accordingly provides for a greater magnification or for increase of speed of operation, other conditions being equal, requires less critical sizing or dimensioning of the nozzles in the manufacture thereof, and permits of increasing the magnification in pneumatic gages now in use.

The pneumatic gaging circuit in accordance with the present invention also permits of controlling the rate of flow approximately proportional to the square root of the absolute gaging pressure.

The pneumatic gaging circuit in accordance with the present invention also permits of varying the sensitivity in a simple but effective manner.

Other objects and advantageous features of the invention will be apparent from the specification and claims.

Figure 1:
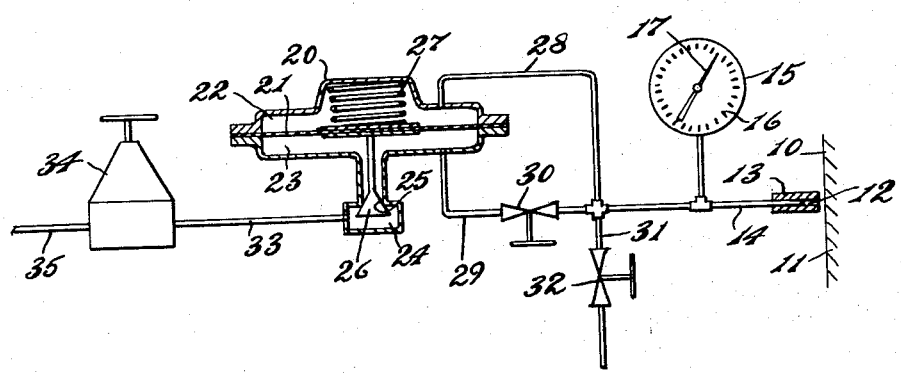
Figure 2:
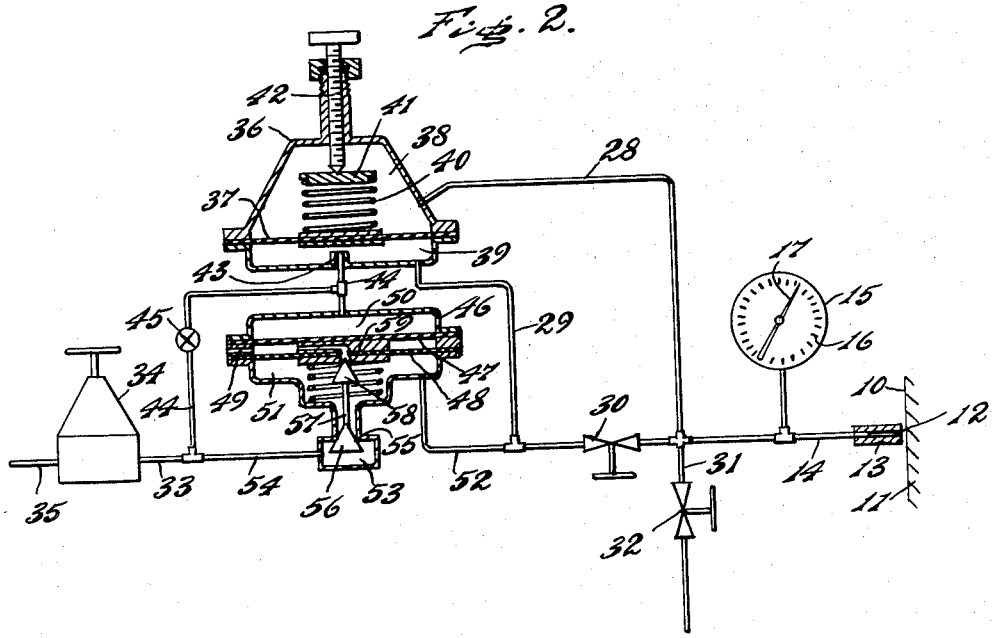

The nature and characteristic features of the invention will be more readily understood from the following description, taken in connection with the accompanying drawings forming part thereof, in which:

Figure 1 is a diagrammatic view of a pneumatic gaging circuit in accordance with the present invention; and Fig. 2 is a diagrammatic view of another form of the pneumatic gaging circuit in accordance with the present invention.

It should, of course, be understood that the description and drawings herein are illustrative merely, and that various modifications and changes can be made in the structure disclosed without departing from the spirit of the invention.

Referring more particularly to Fig. 1 of the drawings, the surface 10 of a work piece 11 is illustrated, with the gaging nozzle 12 of a gage plug 13 contiguous thereto. The spacing between the end of the nozzle 12 and the surface 10 of the work piece 11 indicates the dimension to be measured. It will, of course, be understood that the gage plug 13 may be of the internal or external type and adapted for any of the purposes for which gage plugs are employed.

The gage plug 13 has a conduit or fluid connection 14 connected thereto to which a pressure gage 15 is connected. The pressure gage 15 is preferably of the Bourdon dial type with a visible face 16 and movable indicator pointer 17 for ascertaining and indicating the pressure conditions prevailing in the conduit 14. The visible face 16 of the pressure gage 15 is preferably calibrated in dimensional units.

A constant differential relay or flow controller 20, which may be of any preferred type, is provided for regulating the flow of the gaging fluid.

The relay or flow controller 20, illustrated diagrammatically, preferably has a differential pressure responsive diaphragm 21 therein, separating a diaphragm chamber 22 from a diaphragm chamber 23. A valve chamber 24 is provided, communicating with the chamber 23 and having a valve seat 25. A valve plug 26, connected to the diaphragm 21 and movable therewith is provided, the spacing of the plug 26 with respect to the seat 25 determining the delivery of fluid from the chamber 24 to the chamber 23.

A spring 27 in the chamber 22 and bearing at one end on the diaphragm 21 tends to urge the valve plug 26 away from its seat 25. The diaphragm chamber 22 is preferably connected by a fluid connection 28 to the fluid connection 14. The diaphragm chamber 23 is connected by a fluid connection 29 to the junction of the connections 28 and 14 and an adjustable restriction 30 is provided between such junction and the chamber 23. The restriction 30 is constant for any particular setting thereof.

The junction of the fluid connections 28, 14 and 29 can also have connected thereto a fluid connection 31 with an adjustable restriction 32 therein, for permitting a controlled discharge of a portion of the fluid available for delivery through the fluid connection 14. The flow controller 20 has a supply connection 33 which is preferably connected to the delivery side of an adjustable pressure regulator 34 to which gaging fluid, such as air, is supplied under pressure from a supply conduit 35.

The pressure across the restriction 30 is thus effective on the diaphragm 21 for determining the positioning of the valve plug 26 and the flow past the valve seat 25.

Gaging fluid supplied from the supply connection 35 is delivered by the regulator 34 at regulated and constant pressure through the fluid connection 33 to the constant differential relay 20. The fluid from the valve chamber 24 is controlled by the position of the valve plug 26 with respect to the valve seat 25. The position of the valve plug 26 with respect to the seat 25 is determined by the pressures in the diaphragm chambers 22 and 23, and the differential effective in these chambers is also the differential pressure across the restriction 30. Since this differential pressure is balanced by the spring 27 it remains substantially constant. Any tendency for the fluid flow through the restriction 30 to increase beyond the normal level would cause an increase in the differential pressure across the restriction 30 and hence the differential pressure applied on opposite sides of the diaphragm 21. Such an increase in differential pressure would cause the diaphragm 21 to move in an upward direction to move the valve plug 26 closer to the valve seat 25, so as to restore the flow through the restriction 30 to its normal value.

Fluid is delivered from the restriction 30 to the gaging nozzle 12, which is in proximity to the working surface 10, which surface by its spacing with respect to the nozzle 12 restricts the flow therefrom and causes a back pressure to exist in the fluid connection 14 between the restriction 30 and the nozzle 12. The magnitude of this back pressure depends on the clearance of the work surface 10 from the nozzle 12, within a predetermined range which is useful for dimensional measurement.

Pressure in the fluid connection 14 can be read at the gage 15 which is provided with a scale on its open face 16 calibrated dimensionally.

The fluid connection 31, with its restriction 32, permits of venting some of the fluid from the fluid connection 14 in accordance with the adjustment of the restriction 32 so as to vary the sensitivity of the gaging circuit.

It will be noted that although the differential pressure across the restriction 30 is maintained constant, the absolute pressure level effective at this restriction depends on the back pressure in the fluid connection 14. If the pressure in the fluid connection 14 increases, the mass rate of flow through the restriction 30 will increase although the differential across the restriction 30 is controlled at a constant level. This relationship can be better explained by reference to the approximate formula:

$$F = K - \sqrt{(P_1 - P_2)P_2}$$

which describes the flow of a compressible fluid through an orifice with less than critical pressure drop. In this formula F is the mass rate of flow, $P_1$ is the absolute pressure upstream of the orifice and $P_2$ is the absolute pressure downstream of the orifice, while K is a constant whose value depends on the specific gravity and temperature of the fluid, the size and shape of the orifice, and the choice of units for expressing F, $P_1$ and $P_2$. In the circuit of the present invention the differential $P_1 - P_2$ is held constant or nearly so by the action of the diaphragm 21 upon the valve member 26 in response to the pressures $P_1$ and $P_2$ in connections 29 and 28, respectively. Thus if $P_1 - P_2$ in the above formula is replaced by a constant designated by $(K_1)^2$ this formula may be simplified to $$F = K K_1 \sqrt{P_2}$$

From this it will be seen that the mass rate of flow through the restriction 30, under the conditions prevailing in the circuit, is proportional to the square root of the absolute value of the gaging pressure in the fluid connections 14 and 28 and effective at the pressure responsive indicator 15. When the surface 10 approaches the nozzle 12 the back pressure in the fluid connection 14 increases. This in turn causes an increase in the mass rate of flow which causes a still further increase of the pressure in the fluid connection 14 with the result that the pressure in the fluid connection 14 will increase more for a given change in clearance than would occur with a restriction subject to constant pressure.

Referring now more particularly to Fig. 2 of the drawings, a pilot valve operated constant differential control relay is provided which has a differential pressure responsive portion 36 with a diaphragm 37 separating a diaphragm chamber 38 from a diaphragm chamber 39. The fluid connection 28 is connected to the chamber 38 and the fluid connection 29 is connected to the chamber 39.

A loading spring 40 is provided in the chamber 38 bearing at one end on the diaphragm 37. The spring 40, at its other end, is in engagement with an adjustable abutment plate 41 positioned by an adjusting screw 42 carried in the housing of the pressure responsive portion for regulating the force applied by the spring 40 against the diaphragm 37. The diaphragm chamber 39 has a pilot nozzle 43 terminating therein with respect to which the diaphragm 37 is movable for varying the discharge therefrom to the chamber 39. The nozzle 43 has a fluid connection 44 connected thereto with which the supply connection 33 from the regulator 34 is in communication, the fluid connection 44 having interposed therein a restriction 45.

A booster relay 46 is provided as part of the control relay, and actuated by the pilot nozzle 43, which may be of any desired type, such, for example, as that shown in the patent to C.B. Moore, No. 2,501,957.

As illustrated the booster relay 46 has a pair of diaphragms 47 and 48 held in spaced relation, and with a vent 49 from the space therebetween to the atmosphere. The diaphragm chamber 50, above the diaphragm 47, has the fluid connection 44, between the restriction 45 and the nozzle 43, in communication therewith. The diaphragm chamber 51 below the diaphragm 48, has a fluid connection 52 communicating with the fluid connection 29. The diaphragm chamber 51 has a valve chamber 53 in communication therewith, the chamber 53 being connected to the fluid connection 33 by a fluid connection 54.

The valve chamber 53 has a valve seat 55 and a valve plug 56 is provided in the valve chamber 53 for engagement with the seat 55. The valve plug 56 is connected by a stem 57 to a valve plug member 58 which is engageable with a seat 59 carried by the diaphragm 48 with a port in communication with the space between the diaphragms 47 and 48.

The operation of the structure shown in Fig. 2 is similar to that previously described except for the use of the constant differential control relay 36, 46, in place of the direct acting relay 20.

Changes in the differential pressure across the restriction 30 are effective on the diaphragm 37, causing it to move and thereby control the flow of pilot fluid into the chamber 39 from the nozzle 43. The nozzle 43 is supplied through the restriction 45 with fluid from a pressure regulated source, such as that of the regulator 34. Accordingly, the back pressure at the nozzle 43 is a function of its clearance with respect to the diaphragm and this back pressure is effective through the fluid connection 44 to operate the booster relay 46, as required, to maintain a constant differential across the restriction 30.

The relay 46 provides additional amplificaion so that the differential pressure across the restriction 30 will be maintained more nearly constant and will be less affected by variations in pressure from the supply regulator 34.

In both forms of the invention a constant differential pressure is maintained across the restriction 30 which is subjected to the gaging pressure, and attendant upon this there will be a greater pressure change in the fluid connection 14 for a given motion or change of spacing of the surface 10 with respect to the nozzle 12 than would otherwise occur.

I claim:

1. In a measuring device, a source of gaging fluid under pressure, a variable restriction member connected in series with said source, a constant restriction member having upstream and downstream connections, said upstream connection being connected in series with said variable restriction member, means connected respectively to said upstream and downstream connections for controlling said variable restriction member in accordance with the differential of the pressure in said upstream and downstream connections, said restriction members being so connected that all the fluid passing through either of said restrictions passes through the other, a gaging member connected to said downstream connection, the pressure at said gaging member being effective at said downstream connection, said gaging member having a discharge opening controlled by dimension of the work to be gaged, and pressure responsive means interposed between said constant restriction member and said gaging member.

2. In a measuring device, a source of fluid under pressure, a valve member connected in series to said source, a constant restriction member having upstream and downstream connections, said upstream connection being connected in series to said valve member, means connected respectively to said upstream and downstream connections for controlling said valve member in accordance with the differential of the pressure in said upstream and downstream connections, said valve member and said restriction member being so connected that all the fluid passing through either of said members passes through the other, a gaging member connected to said downstream connection and having a discharge opening controlled by a dimension of the work to be gaged, the pressure effective at said gaging member being effective at said downstream connection, said valve member determining the flow of the fluid delivered to said gaging member, and pressure responsive means interposed between said constant restriction member and said gaging member.

References Cited in the file of this patent

UNITED STATES PATENTS

| | | |
|---|---|---|
| 2,486,052 | Moore | Oct. 25, 1949 |
| 2,660,886 | Milmore | Dec. 1, 1953 |
| 2,703,013 | Wildhack | Mar. 1, 1955 |
| 2,845,792 | Eisenhardt | Aug. 5, 1958 |